US012775525B2

(12) United States Patent
Ramabhadran et al.

(10) Patent No.: US 12,775,525 B2
(45) **Date of Patent: *Oct. 27, 2026**

(54) RESTORING A DIRECTORY TO A STATE PRIOR TO A PAST SYNCHRONIZATION EVENT

(71) Applicant: Dropbox, Inc., San Francisco, CA (US)

(72) Inventors: Pranav Vishnu Ramabhadran, Redwood City, CA (US); Ken Park, Pacifica, CA (US); Wes O'Haire, Dublin, CA (US); Raveesh Nayar, San Bruno, CA (US); Helen Lu, San Francisco, CA (US); Grant Mathews, San Francisco, CA (US); Sam Keller, San Francisco, CA (US); Niklas Nordlof, San Francisco, CA (US); Marian Oman, San Francisco, CA (US); Julia Weingardt, Austin, TX (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,848

(22) Filed: Dec. 20, 2023

(65) Prior Publication Data

US 2024/0126651 A1 Apr. 18, 2024

Related U.S. Application Data

(63) Continuation of application No. 16/224,365, filed on Dec. 18, 2018, now Pat. No. 11,940,877.

(Continued)

(51) Int. Cl.

*G06F 16/00* (2019.01)
*G06F 11/1446* (2026.01)

(Continued)

(52) U.S. Cl.

CPC ...... *G06F 11/1448* (2013.01); *G06F 11/1451* (2013.01); *G06F 11/1458* (2013.01);

(Continued)

(58) Field of Classification Search

CPC ............... G06F 16/178; G06F 16/1815; G06F 16/2379; G06F 16/162; G06F 16/182;

(Continued)

(56) References Cited

U.S. PATENT DOCUMENTS 5,600,834 A 2/1997 Howard
5,761,677 A 6/1998 Senator et al.

(Continued)

FOREIGN PATENT DOCUMENTS

CN 114048172 A 2/2022
WO WO2005121959 A2 * 12/2005

(Continued)

OTHER PUBLICATIONS

Nielsen. Confirmation Dialogs Can Prevent User Errors—If Not Overused. https://www.nngroup.com/articles/confirmation-dialog/, Feb. 2018, pp. 1-8. (Year: 2018).*

(Continued)

*Primary Examiner* — Srirama Channavajjala
(74) *Attorney, Agent, or Firm* — Keller Preece PLLC

(57) ABSTRACT

The present technology pertains to restoring a directory to a state prior to a past synchronization event. A content management system can present an interface including history of synchronization events for a directory, and a user can select to restore a directory to a state prior to any one of the past synchronization events.

16 Claims, 17 Drawing Sheets

Related U.S. Application Data

(60) Provisional application No. 62/751,156, filed on Oct. 26, 2018.

(51) Int. Cl.

| | |
|---|---|
| ***G06F 16/17*** | (2019.01) |
| ***G06F 16/178*** | (2019.01) |
| ***G06F 16/18*** | (2019.01) |
| ***G06F 16/182*** | (2019.01) |
| ***G06F 16/23*** | (2019.01) |
| ***G06F 16/27*** | (2019.01) |
| ***H04L 67/1095*** | (2022.01) |

(52) U.S. Cl.
CPC ........ *G06F 16/1734* (2019.01); *G06F 16/178* (2019.01); *G06F 16/1815* (2019.01); *G06F 16/182* (2019.01); *G06F 16/2308* (2019.01); *G06F 16/235* (2019.01); *G06F 16/2358* (2019.01); *G06F 16/2379* (2019.01); *G06F 16/27* (2019.01); *H04L 67/1095* (2013.01)

(58) Field of Classification Search
CPC .... G06F 16/23; G06F 16/2308; G06F 16/235; G06F 16/2358; G06F 16/27; G06F 16/1734; G06F 11/1448; G06F 11/1451
See application file for complete search history.

(56) References Cited

U.S. PATENT DOCUMENTS 5,794,005 A 8/1998 Steinman
6,185,577 B1 2/2001 Nainani et al.
6,209,128 B1 3/2001 Gerard et al.
6,324,495 B1 11/2001 Steinman
7,222,233 B1 5/2007 Rubin
7,406,596 B2 7/2008 Tararukhina
7,440,965 B1 10/2008 Pruthi et al.
7,457,826 B2 11/2008 Hudis et al.
7,853,566 B2 12/2010 Cisler et al.
7,860,839 B2 12/2010 Cisler et al.
8,099,392 B2 1/2012 Paterson et al.
8,099,605 B1 1/2012 Billsrom et al.
8,825,597 B1* 9/2014 Houston ................. G06F 16/10 707/625
8,849,764 B1 9/2014 Long et al.
9,185,164 B1 11/2015 Newhouse
9,251,235 B1 2/2016 Hurst et al.
9,535,932 B1 1/2017 DeSantis et al.
9,552,407 B1 1/2017 Hurst et al.
9,747,297 B2* 8/2017 Penangwala .......... G06F 16/178
9,922,043 B1 3/2018 Smith et al.
10,069,914 B1 9/2018 Smith
10,558,619 B2 2/2020 Rodrigues et al.
11,531,648 B2* 12/2022 Smith ................... G06F 16/178
2002/0049883 A1 4/2002 Schneider et al.
2003/0028736 A1 2/2003 Berkowitz et al.
2004/0133544 A1 7/2004 Kiessig et al.
2004/0133589 A1 7/2004 Kiessig et al.
2006/0136501 A1 6/2006 Ijeomah et al.
2006/0168000 A1 7/2006 Bodlaender et al.
2006/0253502 A1 11/2006 Raman et al.
2007/0028063 A1 2/2007 Hars et al.
2007/0094312 A1* 4/2007 Sim-Tang ............. G06F 16/125
2008/0034013 A1 2/2008 Cisler et al.
2008/0034039 A1 2/2008 Cisler et al.
2008/0034307 A1 2/2008 Cisler et al.
2008/0256138 A1* 10/2008 Sim-Tang ........... G06F 16/1873
2009/0138808 A1 5/2009 Moromisato et al.
2009/0271620 A1 10/2009 Sudhakar
2010/0125588 A1 5/2010 Mehra et al.
2010/0125705 A1 5/2010 Mehra et al.
2010/0125714 A1 5/2010 Mehra et al.
2010/0306171 A1 12/2010 Antos et al.
2010/0325500 A1 12/2010 Bashir et al.
2011/0157609 A1 6/2011 Brady et al.
2011/0161299 A1 6/2011 Prahlad et al.
2012/0254111 A1 10/2012 Carmichael
2012/0310894 A1 12/2012 Freedman et al.
2013/0024722 A1 1/2013 Kotagiri et al.
2013/0054969 A1* 2/2013 Charles ................ H04L 9/3271 713/169
2013/0117337 A1 5/2013 Dunham
2013/0138608 A1* 5/2013 Smith ..................... G06F 16/27 707/610
2014/0006357 A1 1/2014 Davis et al.
2014/0108367 A1 4/2014 Kim et al.
2014/0201145 A1 7/2014 Dorman et al.
2014/0201162 A1* 7/2014 Kumarasamy ...... G06F 11/1469 707/679
2014/0281131 A1 9/2014 Joshi et al.
2015/0082197 A1 3/2015 Pearl et al.
2015/0293818 A1 10/2015 Claes
2015/0331755 A1 11/2015 Morgan
2015/0378834 A1* 12/2015 Bachu ................ G06F 11/1448 707/646
2015/0379038 A1 12/2015 Nikolov
2016/0062839 A1 3/2016 Kapoor
2016/0306986 A1 10/2016 Zhang et al.
2016/0308966 A1 10/2016 Zhang et al.
2016/0308967 A1 10/2016 Zhang et al.
2016/0350327 A1* 12/2016 Fan ......................... G06F 16/16
2017/0031948 A1 2/2017 Xu
2017/0200122 A1 7/2017 Edson et al.
2017/0286229 A1 10/2017 Cheung
2017/0318099 A1 11/2017 Tolmachev
2018/0039654 A1 2/2018 Rodrigues et al.
2019/0020629 A1 1/2019 Baird, III et al.
2019/0095455 A1* 3/2019 Barreto ............... G06F 11/1446
2019/0163765 A1 5/2019 Byun et al.
2019/0182322 A1 6/2019 Kumar et al.
2019/0281010 A1 9/2019 Teverovsky et al.

FOREIGN PATENT DOCUMENTS

WO WO2009132261 A1 * 9/2009
WO WO2016067320 A1 * 5/2016

OTHER PUBLICATIONS

Qiang Li et al., "CloudSync: Multi-nodes Directory Synchronization", 2012 International Conference on Industrial Control and Electronics Engineering, Oct. 2012, pp. 1470-1473.*
Non-Final Office Action from U.S. Appl. No. 16/223,697 mailed Aug. 16, 2024, 24 pages.
Final Office Action from U.S. Appl. No. 16/223,697, mailed Apr. 2, 2024, 22 pages.
Notice of Allowance from U.S. Appl. No. 16/224,365, mailed Feb. 15, 2024, 5 pages.
Notice of Allowance for U.S. Appl. No. 16/223,697 mailed on Nov. 12, 2024, 15 pages.
Advisory Action from U.S. Appl. No. 16/224,365, mailed Mar. 10, 2021, 4 pages.
Final Office Action from U.S. Appl. No. 16/223,697, mailed Feb. 1, 2022, 18 pages.
Final Office Action from U.S. Appl. No. 16/223,697, mailed Jan. 10, 2023, 23 pages.
Final Office Action from U.S. Appl. No. 16/224,365, mailed Dec. 18, 2020, 15 pages.
Final Office Action from U.S. Appl. No. 16/224,365, mailed Jun. 2, 2023, 20 pages.
Final Office Action from U.S. Appl. No. 16/224,365, mailed Oct. 20, 2021, 18 pages.
Final Office Action from U.S. Appl. No. 16/224,365, mailed Sep. 12, 2022, 19 pages.
Nielsen J., "Confirmation Dialogs Can Prevent User Errors—If Not Overused," https://www.nngroup.com/articles/confirmation-dialog/ , Feb. 18, 2018, pp. 1-8.
Non-Final Office Action from U.S. Appl. No. 16/223,697, mailed Jun. 25, 2021, 17 pages.

(56) References Cited

OTHER PUBLICATIONS

Non-Final Office Action from U.S. Appl. No. 16/223,697, mailed Jun. 28, 2022, 19 pages.
Non-Final Office Action from U.S. Appl. No. 16/223,697, mailed Sep. 1, 2023, 21 pages.
Non-Final Office Action from U.S. Appl. No. 16/224,365, mailed Aug. 3, 2020, 14 pages.
Non-Final Office Action from U.S. Appl. No. 16/224,365 mailed Feb. 14, 2023, 20 pages.
Non-Final Office Action from U.S. Appl. No. 16/224,365, mailed Mar. 23, 2022, 19 pages.
Non-Final Office Action from U.S. Appl. No. 16/224,365, mailed May 17, 2021, 17 pages.
Notice of allowance from U.S. Appl. No. 16/224,365, mailed Nov. 27, 2023, 8 pages.

* cited by examiner

FIG. 4
402
CURRENT STATE
ADDS/MOUNTS Since Past Sync Event
Acme/Presentations
Acme/Presentations/DSAXZC.PPT
Acme/Presentations/MBNJGH.PPT Added
Acme/Presentations/QEWYTRBVC.PPT Added
404
Acme/Presentations/MBNRWE
Acme/Presentations/MBNRWE/CI-1.KEY
Acme/Presentations/MBNRWE/CI-2.JPG
Acme/Presentations/MBNRWE/CI-3.TXT
Acme/Presentations/MBNRWE/CI-4.TIFF
Acme/Presentations/MBNRWE/Sub-Dir Mounted
406
Acme/Presentations/MBNRWE/Sub-Dir/CI-5.PPT Added
404
412
DELETES/UNMOUNTS Since Past Sync Event
Acme/Presentations/MBNRWE/Sub-Dir-2 Unmounted
Acme/Presentations/MBNRWE/Sub-Dir-2/CI-6.TEXT Deleted
408
416
TARGET STATE
Acme/Presentations
Acme/Presentations/DSAXZC.PPT
Acme/Presentations/MBNRWE
Acme/Presentations/MBNRWE/CI-1.KEY
Acme/Presentations/MBNRWE/CI-2.JPG
Acme/Presentations/MBNRWE/CI-3.TXT
Acme/Presentations/MBNRWE/CI-4.TIFF
Acme/Presentations/MBNRWE/Sub-Dir-2
Acme/Presentations/MBNRWE/Sub-Dir-2/CI-6.TEXT
408

540

RESTORING A DIRECTORY TO A STATE PRIOR TO A PAST SYNCHRONIZATION EVENT

CROSS REFERENCE TO RELATED APPLICATIONS

This application is a continuation of U.S. application Ser. No. 16/224,365, filed Dec. 18, 2018, entitled "RESTORING A DIRECTORY TO A STATE PRIOR TO A PAST SYNCHRONIZATION EVENT", which claims the benefit of priority to U.S. provisional application No. 62/751,156, filed on Oct. 26, 2018, entitled "RESTORING A DIRECTORY TO A STATE PRIOR TO A PAST SYNCHRONIZATION EVENT", all of which are hereby expressly incorporated herein by reference in their entireties.

TECHNICAL FIELD

The present disclosure relates to returning a directory, or portions, thereof to the state in which it existed at a prior time, and more specifically relates to restoring a directory to a state prior to a past synchronization event.

BACKGROUND

Errors happen. It is not uncommon for an error to occur that causes a content item or directory to become altered in an undesirable way. When this occurs an ideal solution would be to allow the user to restore the content item or directory to a prior state in which it existed at a prior time. Some technologies exist that can perform this action, subject to one or more undesirable limitations. For example, some technologies allow a user to periodically save a backup of a content item or directory. Unfortunately, these technologies are only able to restore to the specific time(s) for which backups exist. Also, many of these technologies require support from an administrator or information technology specialist.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
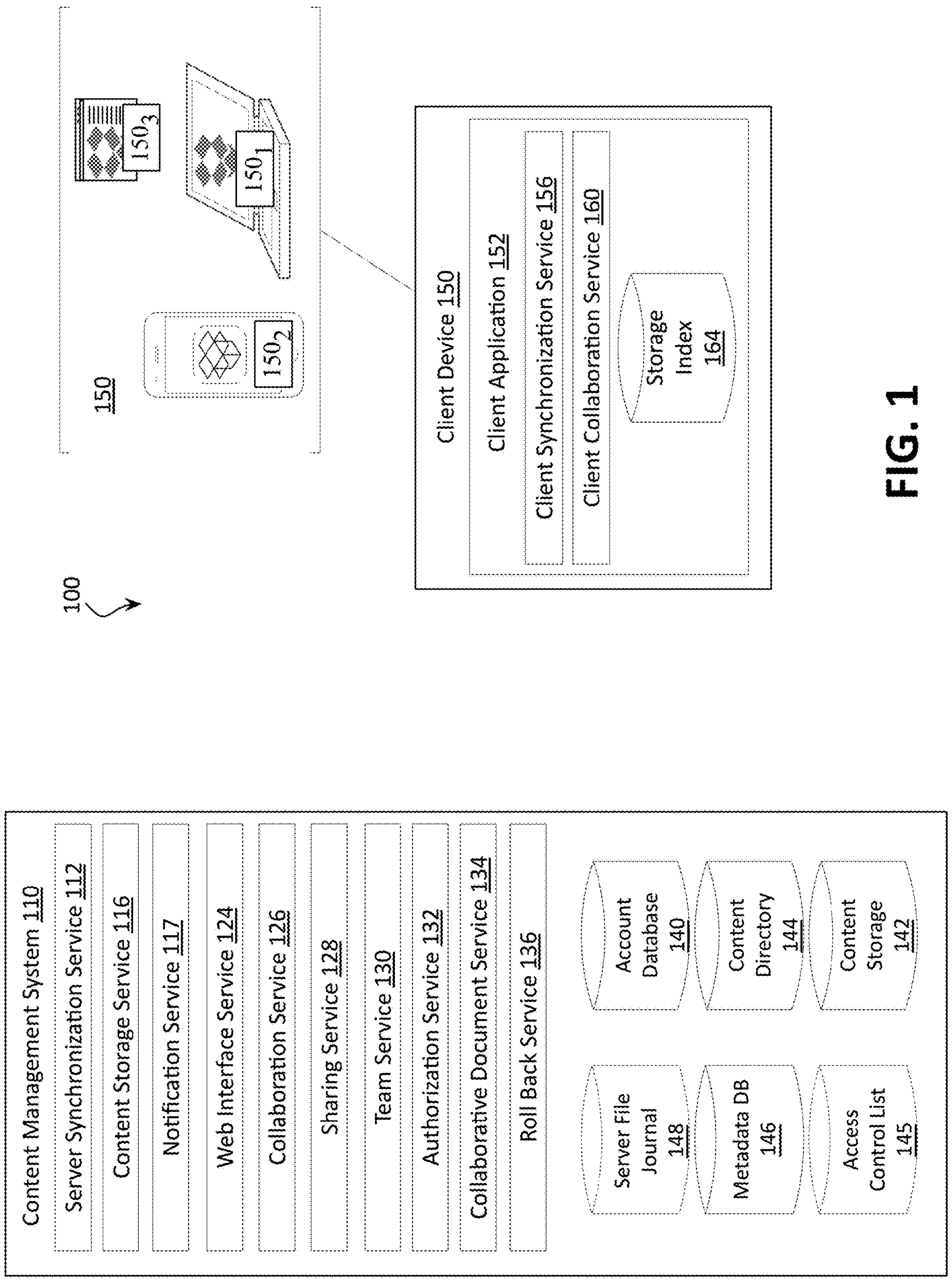
FIG. 1 shows an example of a content management system and client devices in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for a technology to restore a directory of content items, especially a shared directory that is synchronized among a plurality of devices and user accounts, to a state prior to a past synchronization event.

The disclosed technology provides a more granular view of changes to a directory than other products that facilitate a rollback of a folder. Greater granularity allows a user to restore a directory with greater precision to a state just prior to an error that needs to be reversed. Prior art systems may only allow directories to be restored a specific restore point that might be created at broad, periodic intervals, and therefore risk reversing more actions than desired.

The disclosed technology provides a mechanism to restore directories that are both shared amongst multiple user accounts and synchronized across devices associated with the multiple user accounts. While existing technologies might restore a directory on a specific device, the present technology can restore the directory on each device to which the directory is synchronized.

Furthermore, the present technology respects modifications to access control lists even when restoring the directory to a state prior to the access control list modification. Additionally, in some embodiments, a user can only restore a directory back to a state in which the user had access to the directory. Even though the directory may have pre-existed access by the user, the user can only restore the directory to a state in which the user had access to the directory. Other complications relating to access control lists are also addressed by the present technology.

The disclosed technology also provides a view for all changes that have happened in subdirectories and content items subordinate to the directory in the path. This allows a user to determine the best level of a directory tree to restore to a prior state (i.e., it may be less disruptive to restore a subdirectory than a directory superordinate to the subdirectory, depending on the event giving rise to the error).

The disclosed technology also can also permit continued activity in a directory while the directory is being restored. For example, users may have content items they need to save to a shared directory, or need to edit content items in the shared directory, while the shared directory is being restored. The present technology allows a user to continue to work with the directory, even while the directory is being restored. Additionally, other user accounts might be working in the directory at the time a first user initiates a rollback operation on the directory.

In some embodiments the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device 1501 is a computing device having a local file system accessible by multiple applications resident thereon. Client device 1502 is a computing device wherein content items are only accessible to a specific application or by permission given by the specific application, and the content items are typically stored either in an application specific space or in the cloud. Client device 1503 is any client device accessing content management system 110 via a web browser and accessing content items via a web interface. While example client devices 1501, 1502, and 1503 are depicted in form factors such as a laptop, mobile device, or web browser, it should be understood that the descriptions thereof are not limited to devices of these example form factors. For example a mobile device such as client 1502 might have a local file system accessible by multiple applications resident thereon, or client 1502 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management storage service 116. In some embodiments, client synchronization service 156 can perform some functions of content management storage service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

Rollback Service

In some embodiments, content management system 110 includes rollback service 136 which is configured to provide functions useful in returning a content item or directory to a state prior to a synchronization event or collection of synchronization events. Rollback service 136 can determine all changes made to a namespace/directory/content item over a period of time as recorded in server file journal 148, and can surface a user interface for conveying those changes to a user in coordination with web interface service 124 or client application 152. After receiving instructions from client device 150 operated by the user, rollback service 136 can restore a directory or content item to a state prior to a synchronization event designated by the user.

While system 100 is presented with specific components, it should be understood by one skilled in the art, that the architectural configuration of system 100 is simply one possible configuration and that other configurations with more or fewer components are possible.

Figure 2:
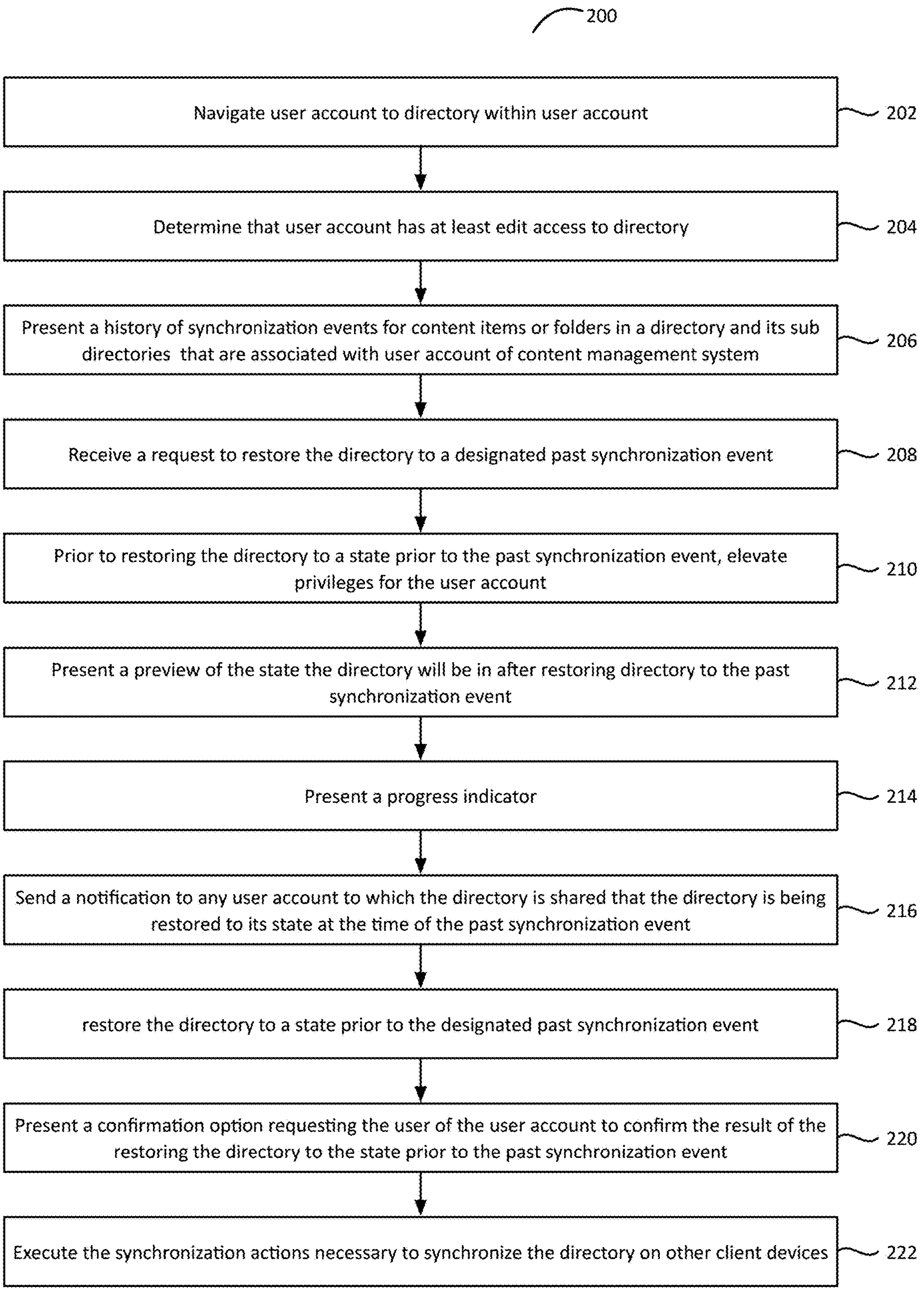
FIG. 2 shows an example method embodiment for restoring a directory in accordance with some aspects of the present technology.

FIG. 2 illustrates a method 200 for conducting a rollback operation to restore a directory to a state prior to a past synchronization event, in accordance with one or more embodiments.

In some embodiments, a user of client device 150 having an account at content management system 110 may desire to return a directory or content item(s) to a state that existed prior to a synchronization event(s) that affected the directory or content item(s). The user can operate client device 150 to navigate (202) to a desired directory to which the user account has at least some level access. In some embodiments, the user can operate client device 150 to navigate a user interface provided by web interface service 124 and rendered by client application 152.

While this description may sometimes reference user interfaces provided by web interface service 124, it should be appreciated that the user interface can alternatively or additionally be provided directly by client application 152 by requesting desired information directly from the applicable services of content management system 110. It should be appreciated that references to user interfaces provided by web interface service 124 should not be considered limiting of the present technology and such interfaces may be presented through other mechanisms, such as, but not limited to client application 152.

The user interface presenting the directory restore option can be presented with an interface presented by rollback service 136. Rollback service 136 can interact with server file journal 148 to collect a history of synchronization events for a directory associated with a user account to be presented by web interface service 124 in a user interface on client device 150.

In some embodiments, prior to presenting the history of synchronization events, rollback service 136 can determine (204) whether the user account has edit access to the directory. Determining (204) whether the user account has edit access can include both determining that the user account presently has edit access, and determining when the user account was first granted edit access. Rollback service 136 can determine that a user account has current access to the directory by determining that the user account is listed in access control list 145, when access to a directory is controlled by such list, or by determining that a global access policy for an organization or group applies to the directory and determining that the user account is a member of the organization or group. Rollback service 136 can determine when the user account was granted access to the directory by looking for an appropriate entry pertaining to the user account and the directory in server file journal 148, or metadata database 146.

As illustrated in FIG. 2, web interface service 124 can present (206) the history of synchronization events for a directory to which the user account has at least edit access. The history of synchronization events should only extend back in time to when the user was first granted edit access to the directory.

In some embodiments, the history of synchronization events for the directory lists past synchronization events that may have caused changes for content items or folders in the directory and its subdirectories. In some embodiments the history can include aggregated synchronization events to reduce the length of the list, and to provide a better user experience.

The user may operate client device 150 to select a state prior to a past synchronization event to which to restore the directory. In some embodiments the selection can be a selection of one of the past synchronization events in the presented history of synchronization events. In some embodiments, the selection can be a selection of a representation of state of the directory prior to the past synchronization event. In some embodiments, the selection can be a selection of a point in time prior to the past synchronization event. Regardless of the mechanism used (selecting a past synchronization event, a representation of the directory prior to the synchronization event, or selecting a time prior to the synchronization event, etc.) to select the state to which to restore the directory, the selection can be received (208) by content management system 110 and used to determine the past synchronization event(s) to be rolled back to restore the directory to the selected state.

In some embodiments, rollback service 136 may request the user account elevate their privileges prior to proceeding with restoring the directory to the past synchronization event. In response, the user can elevate (210) their privileges to restore the directory to the state at the past synchronization event. While the user account may already be logged-in with edit privileges to the directory, it can be useful to ask the user to confirm that they want to proceed (confirmation can be a minimum level of privilege elevation) with the rollback operation. In some embodiments, the user might be required to enter administrator credentials. In some embodiments, the user account might be logged in with read only privileges, but has edit privileges associated with the account, and thus elevating the log-in to edit rights is sufficient privilege elevation.

In some embodiments, rollback service 136 can present a preview (212) of what the directory will look like after it has been restored to the earlier state. In some embodiments, rollback service 136 can require the user to review the preview and confirm that the user wishes to proceed with the restore operation.

In some embodiments, rollback service 136 can present a progress indicator (214) showing the progress of the restoration of the directory. In some embodiments, the progress indicator can reflect a number of operations that have been performed relative to the number of operations remaining to be performed. In some embodiments, the progress indicator can reflect an estimated time remaining to complete the restoration of the directory.

In some embodiments, rollback service 136 can send (216) a notification to any user account to which the directory is shared notifying that the directory subject to a rollback operation and is being restored to its state prior to the past synchronization event.

At some time after receiving the request (208), rollback service 136 will finish restoring (218) the directory to the designated past synchronization event. After the directory has been returned to its state prior to the past synchronization event, rollback service 136 can present (220) a confirmation option requesting the user of the user account to confirm the result of the rollback operation. Assuming the directory looks to have been restored to a state desired by the user, the user can select the presented (220) option, but if the directory does not look as the user desires, the user can reject the option to undo the changes and return the directory to its state prior to the rollback operation.

After the directory has been restored, synchronization service 112 can execute (222) the synchronization actions necessary to synchronize the restored directory to other client devices 112 (both associated with the user account and associated with other user accounts with which the directory has been shared).

In order to present the preview (212) of the state that the directory will be in after restoring the directory to its state prior to the past synchronization event, and in order to present a progress indicator (214) while the rollback operation is in progress, rollback service 136 must first determine a predicted state to which the directory will be returned, and must calculate a rollback plan to transition the directory from its current state to its restored state.

Figure 3:
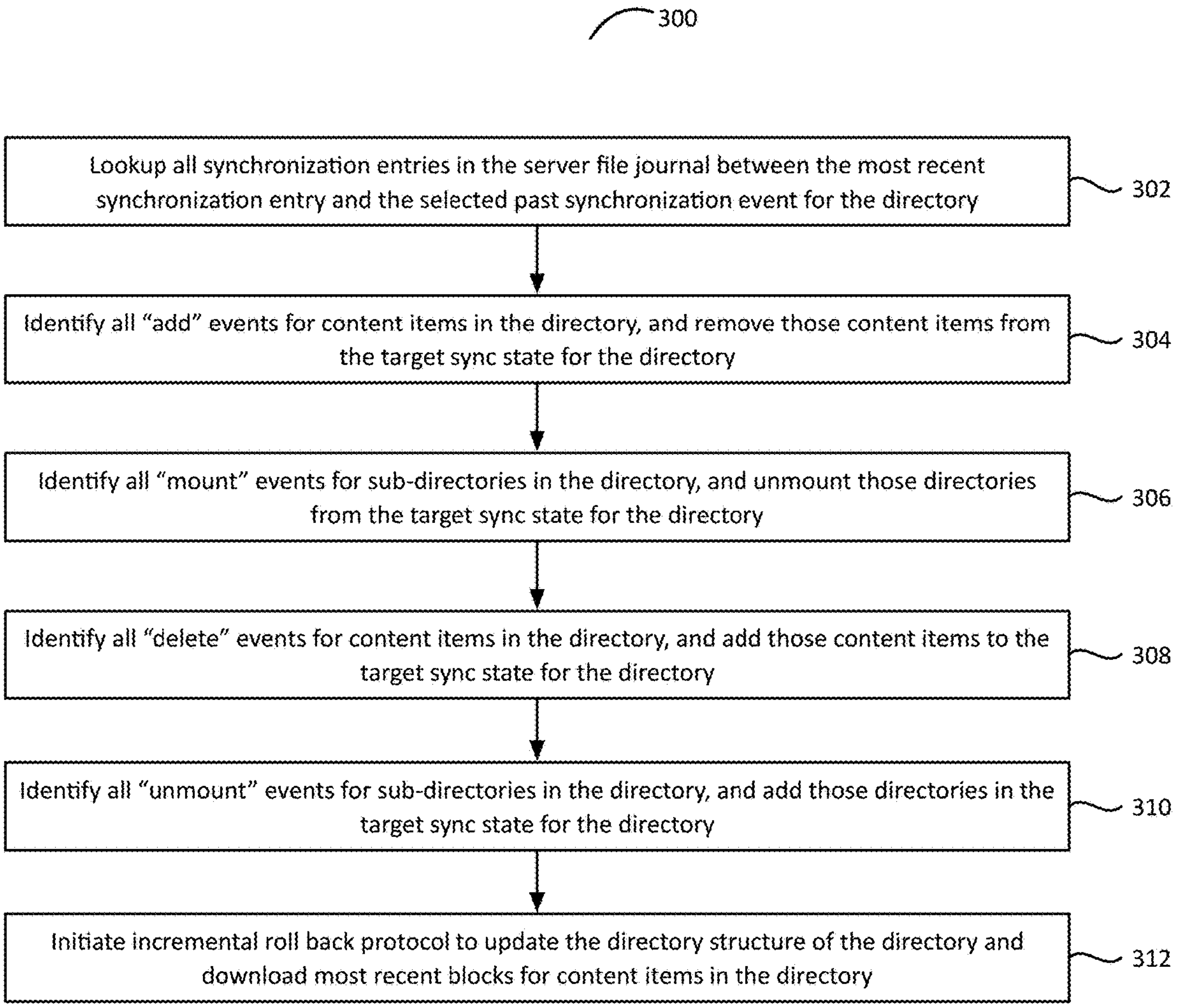
FIG. 3 shows an example method embodiment for determining a target directory in a roll back operation in accordance with some aspects of the present technology.

FIG. 3 illustrates an example method 300 for creating a target state for the directory after it has been restored to the prior state. FIG. 3 will be discussed in the context of FIG. 4 which illustrates the determination of a target state for the directory.

Figure 4:
FIG. 4 shows example operations for determining a target directory in a roll back operation in accordance with some aspects of the present technology.

Method 300 in FIG. 3 begins when rollback service 136 performs a look up (302) of all synchronization entries in server file journal 148 for the directory between the most recent synchronization entry and a synchronization event just prior to the selected prior state of the directory. From these synchronization entries, rollback service 136 can identify (304) all add events for content items in the directory and remove those content items from the target state for the directory since these content items were added in the period of time between when the selected past synchronization event occurred and the present state of the directory. For example, FIG. 4 illustrates the current state 402 of the directory showing each content item and subdirectory therein. FIG. 4 also shows an identification of added content items 404 which are represented in the present state, but not represented in target state 416 of the directory.

Similarly, as illustrated in FIG. 3, rollback service 136 can identify (306) all mount events for subdirectories in the directory and can remove those subdirectories from target state 416 of the directory as these subdirectories were added to the directory in the period of time between when the selected past synchronization event occurred and the present state of the directory. For example FIG. 4 illustrates mounted subdirectory 406 in current state 402 of the directory that is not in target state 416 of the directory.

Rollback service 136 can also identify all delete events (308) and all unmount events (310) and can add these content items and subdirectories to the target state since they were present at the time of the selected past synchronization event. For example, FIG. 4 illustrates all delete and unmount events 412 that have occurred after the selected past synchronization event. These events 408 can also be found represented in target state 416 of the directory.

Once target state 416 of the directory has been determined, rollback service 136 can initiate (312) an incremental rollback protocol to update the directory structure of the directory, and then restore each content item in the directory to their state prior to the selected past synchronization event.

The incremental rollback protocol can synchronize one subdirectory at a time or synchronize a batch of content items before restarting the synchronization process to determine any changes between the existing state of a directory and a target state of the directory. Utilizing an incremental rollback protocol is useful to allow a directory undergoing a rollback operation to remain active for user accounts to access. While a directory is undergoing a rollback, a user account may make additional modifications in the directory. In some embodiments, these modifications made during the rollback operation can be treated as modifications that have occurred subsequent to the rollback operation. As such these changes will cause an update to the target state of the directory. The incremental process of performing some synchronization actions, and then updating the target state of the directory can also be useful to avoid performing one or more scheduled actions that become unnecessary due to the modifications.

Rollback service 136 can restore each content item in the directory to their state as they existed when the directory was in the selected state. The mechanism for restoring a content item can differ depending on whether the directory is being restored at content management system 110 or being restored at client device 150. Since content management system 110 stores all current and past blocks that make up current and previous versions of content items, restoring a content item to its prior state at content management system 110 requires updating references to the blocks in content storage 142 that make up the version of the content item as it existed when the directory was in the selected state. However, client device 150 may not keep old blocks that make up a content item. Accordingly, at client device 150 rollback service 136 can utilize functionality of the server synchronization service 112 to compare blocks making up a content item as described above with respect to FIG. 1. Restoring each content item in the directory can involve actually sending any blocks necessary to make up the previous version of the content item and deleting or caching unused blocks. In this way rollback service 136 can recover and restore the previous version of an edited content item on client device 150.

Figure 5A:
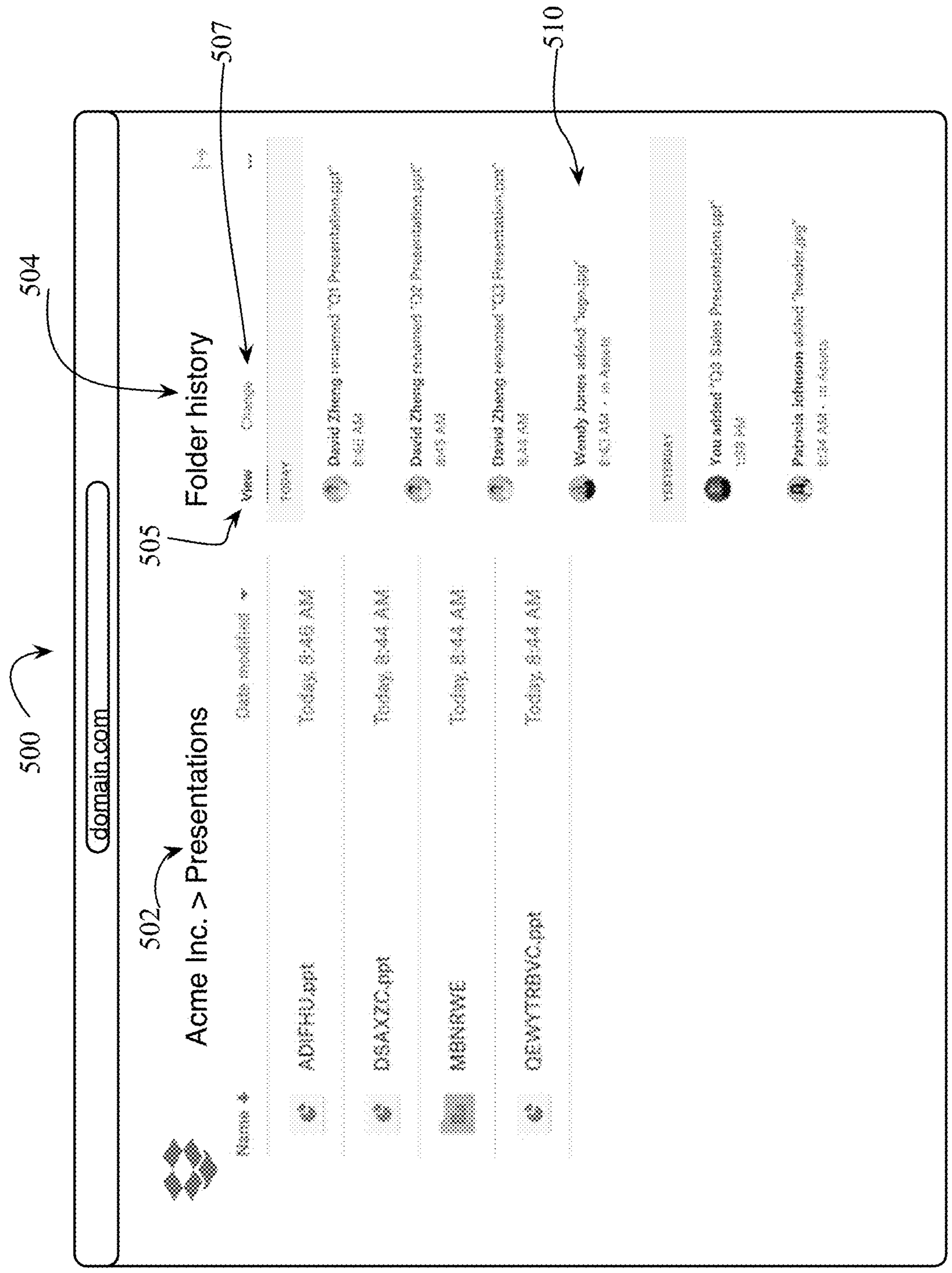
FIG. 5A and FIG. 5B show example user interfaces in accordance with some aspects of the present technology.

FIG. 5A illustrates an example user interface 500 presented by web interface service 124 or client application 152 showing a collection of subdirectories and content items in directory 502, and a folder history panel 504. Folder history panel 504 includes a collection of synchronization events 510 that have occurred in directory 502. Additionally, folder history panel 504 includes tabs such as “view” 505 to view the collection of synchronization events 510, and “change” 507 (addressed with respect to FIG. 5B).

Figure 5B:
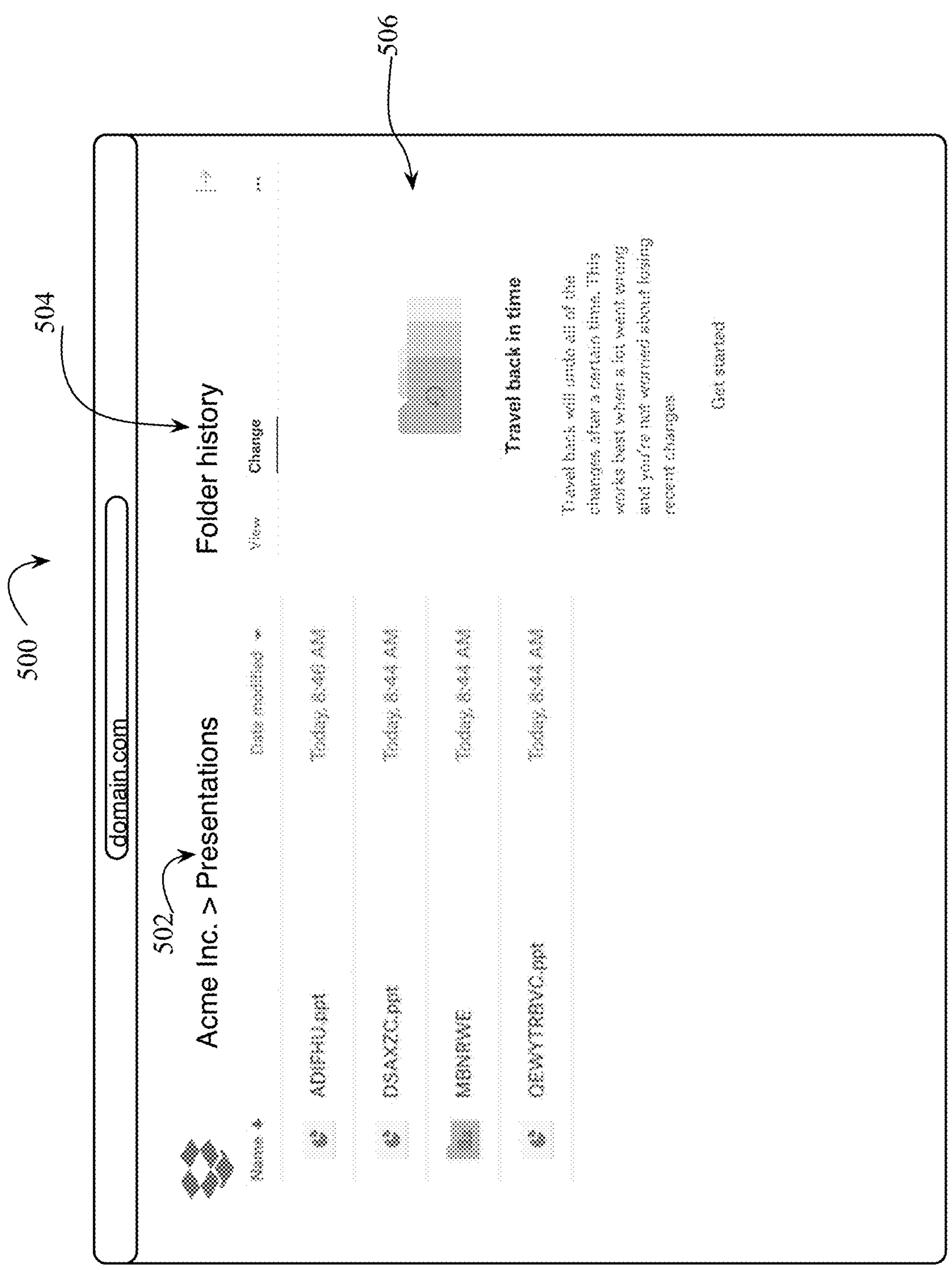

FIG. 5B illustrates user interface 500 showing a rollback screen for directory 502. As in FIG. 5A user interface 500 shows a collection of subdirectories and content items in directory 502, but in FIG. 5B “change” 507 tab in folder history panel 504 is active. Under the “change” 507 tab folder history panel 504 includes a tip card 506 explaining the availability of and use of the roll back operation. In some embodiments, tip card 506 provides a notification that the directory can be restored to a state that existed for the directory before any of the synchronization events in the history of synchronization events took place.

Figure 6A:
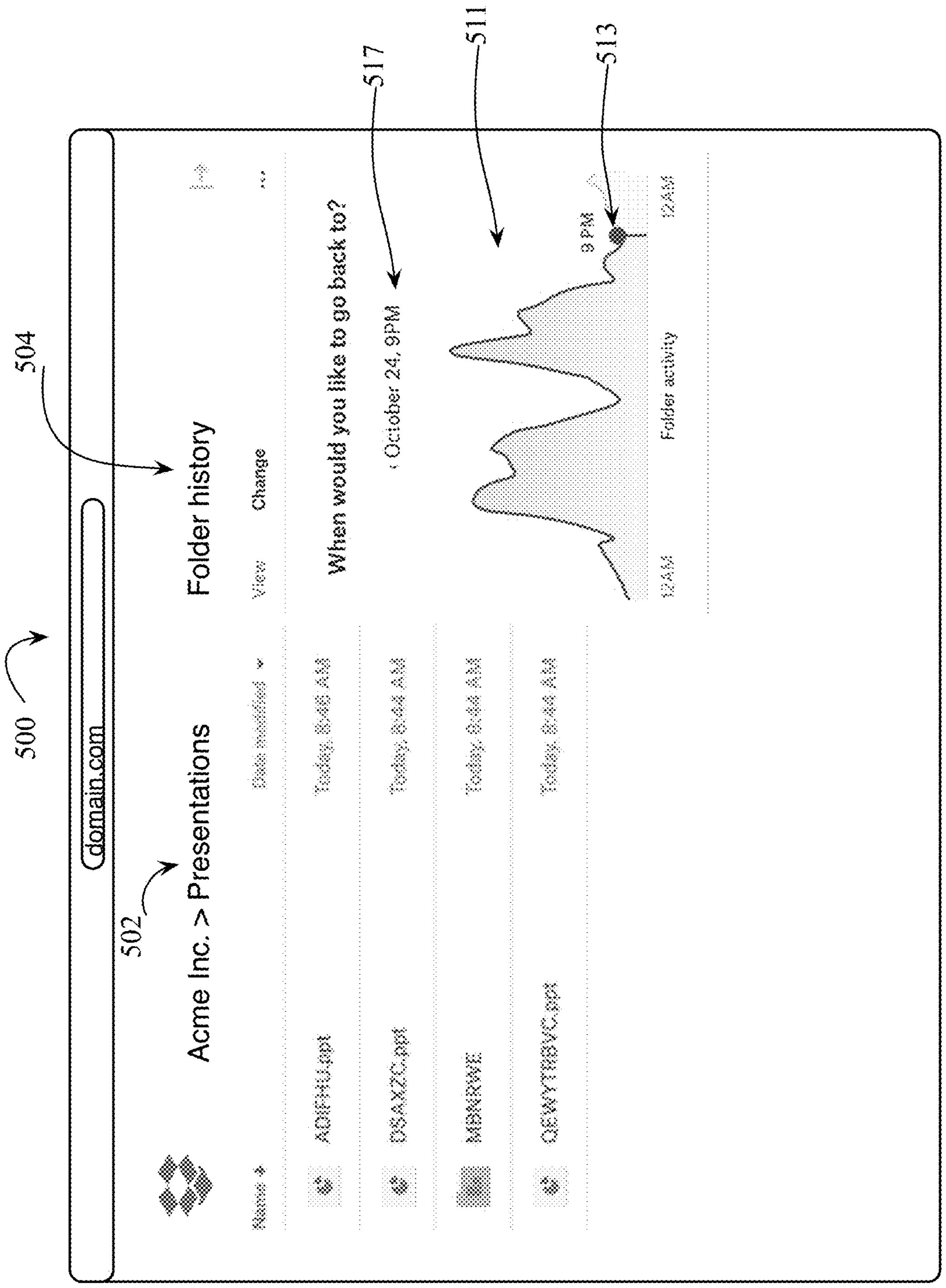
FIG. 6A and FIG. 6B shows example user interfaces in accordance with some aspects of the present technology.

FIG. 6A illustrates user interface 500 showing folder history panel 504 in rollback screen for directory 502 after tip card 506 (FIG. 5B) has been dismissed. Folder history panel 504 displays a time selector 511 user interface. In some embodiments, time selector 511 is a graph that reflects a volume of synchronization activity for directory 502 and its subfolders where selector 513 can be dragged to a desired location in the graph. Time selector 511 user interface can also include a date picker 517 to permit a user to select a date for which they wish to browse synchronization events. In some embodiments, time selector 511 can be any user interface effective to select a time range.

Figure 6B:
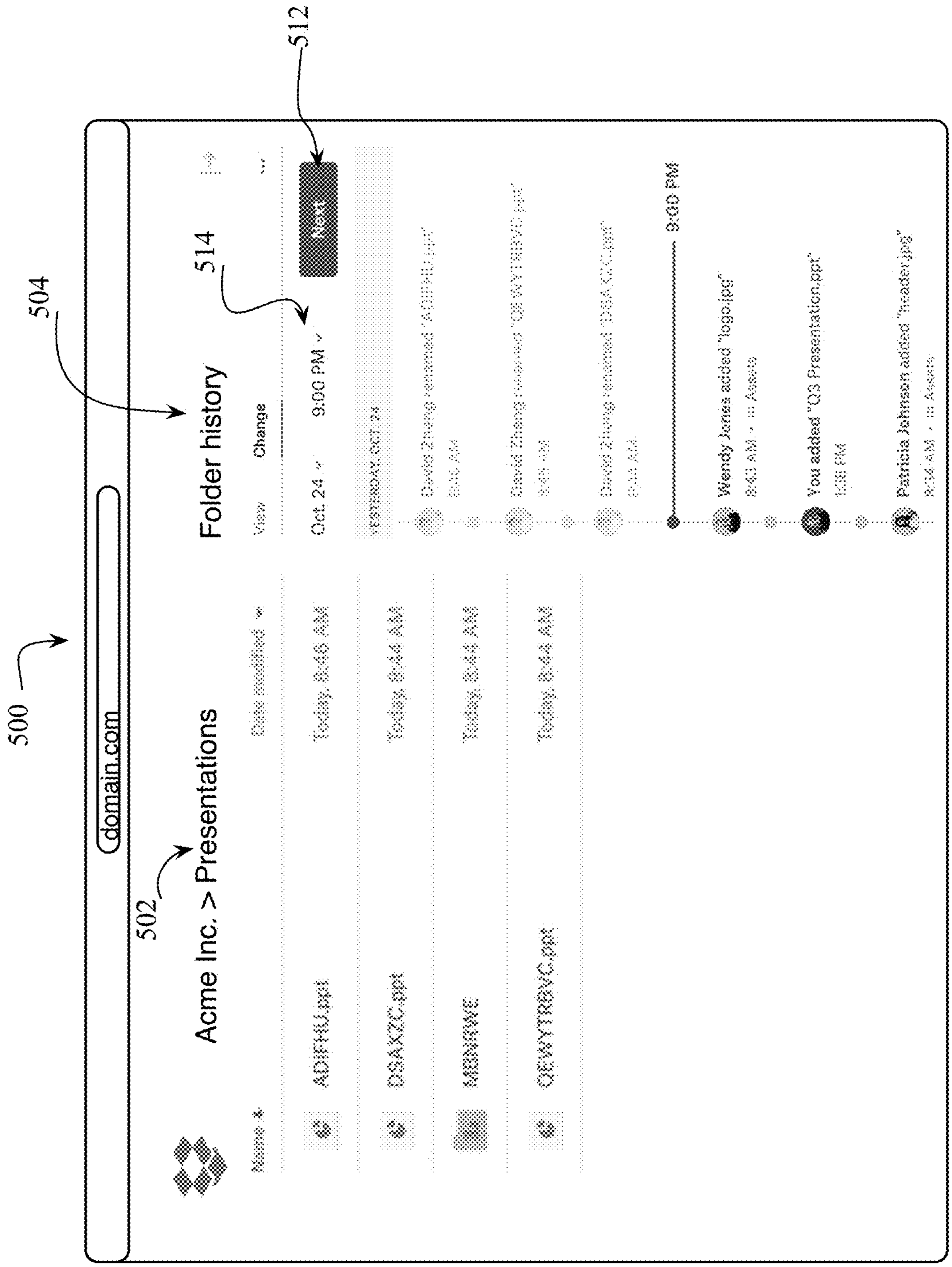

FIG. 6B illustrates user interface 500 showing folder history panel 504 showing list of synchronization events 510 centered around a selected time. The time can be selected using time selector 511 shown in FIG. 6A or time picker 514 in FIG. 6B, or by scrolling list of synchronization events 510. In some embodiments, synchronization events 510 above the selected time reflect synchronization events that are more recent than the selected time, and therefore these events would be rolled-back. In some embodiments, these events can be grayed out or crossed out to reflect that rolling back the directory to the selected state would roll-back these synchronization events.

In some embodiments, synchronization events 510 in panel 504 can be aggregations of synchronization events. The aggregation can be based upon at least one criterion. In some embodiments, the criterion can be that all of the synchronization events are received at the same time. In some embodiments the criterion can be that all of the synchronization events are the result of the same user action. For example if a user adds a new subdirectory that includes one hundred content items, the user perceives that they have added the new subdirectory while server synchronization service 112 detects that one hundred content items were added and a new subdirectory was created. Accordingly, those events detected by server synchronization service 112 and recorded in server file journal 148 can be aggregated into a single listing in user interface 500.

While some embodiments of the present technology include user interfaces for selecting a past time that appears to reflect past state of a directory at that time, a user is really selecting which synchronization events to roll back. The time reflected in the various user interfaces might not correspond to how the directory actually appeared to the user at that time. This is because the time scale reflected in the various user interfaces described herein reflects timestamps for when a synchronization event was entered into server file journal 148. The synchronization event might not have been completed on client device 150 at that time. Also some synchronization events cannot be performed instantaneously and therefore extend over a range of time. To account for these factors, rollback service 136 will display a synchronization event at the time recorded in server file journal 148. The synchronization event can then be displayed relative to a selected state to roll-back the directory. Any synchronization events appearing in the user interface to have occurred subsequent to the selected state will be scheduled to be rolled back during the rollback operation.

Figure 7A:
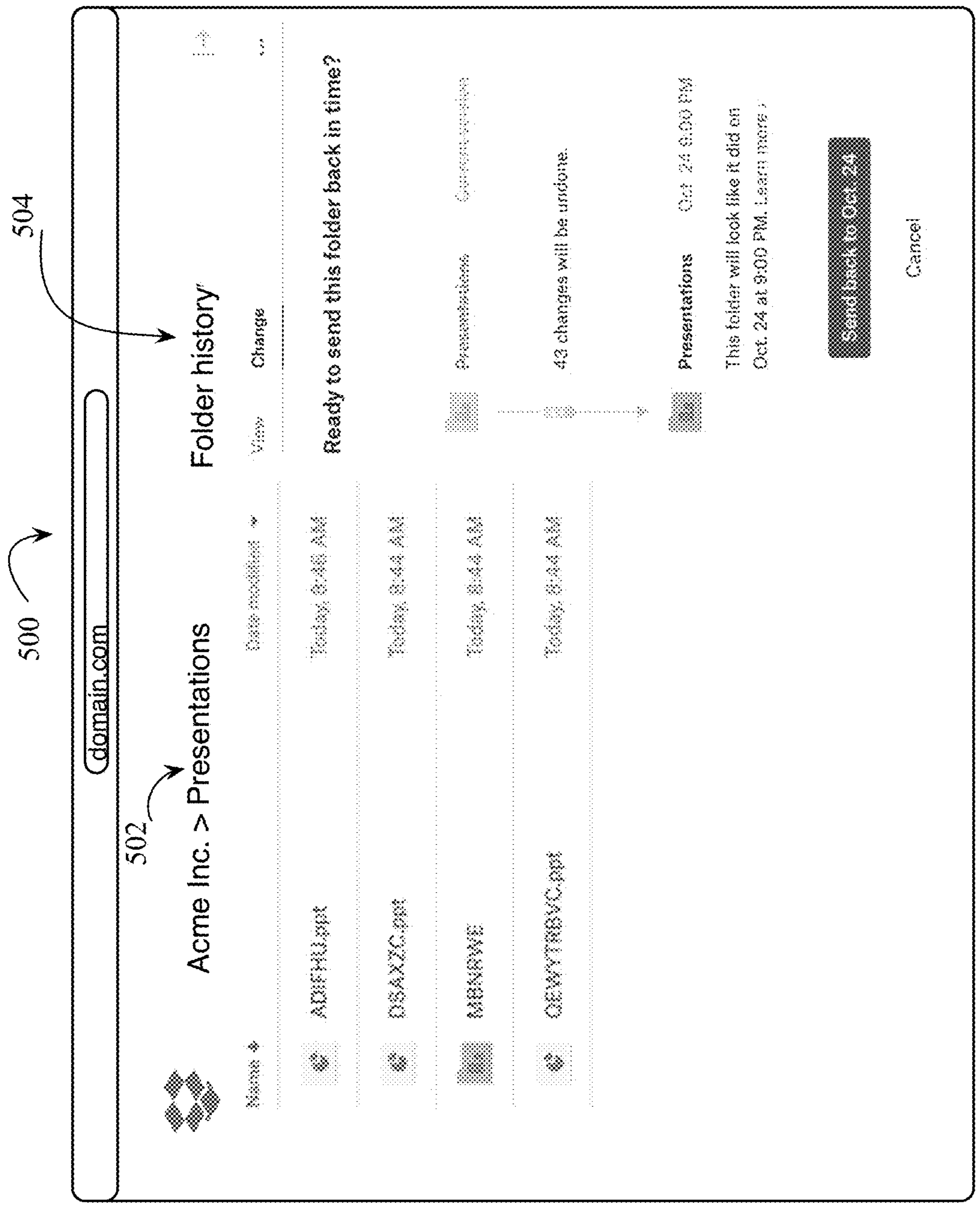
FIG. 7A and FIG. 7B shows example user interfaces in accordance with some aspects of the present technology.

Once the user has chosen a selected time, which reflects a selected state, to which the user would like to restore directory 502, the user can operate button 512 to proceed to user interface 500 shown in FIG. 7. FIG. 7 illustrates user interface 500 showing folder history panel 504 confirming that the user would like to restore directory 502 to the state in which it existed at the specified time prior to any synchronization events that are to be rolled back. In FIG. 7 folder history panel 504 also presents information regarding the scope of the roll back—e.g., that 43 changes will be undone.

Figure 7B:
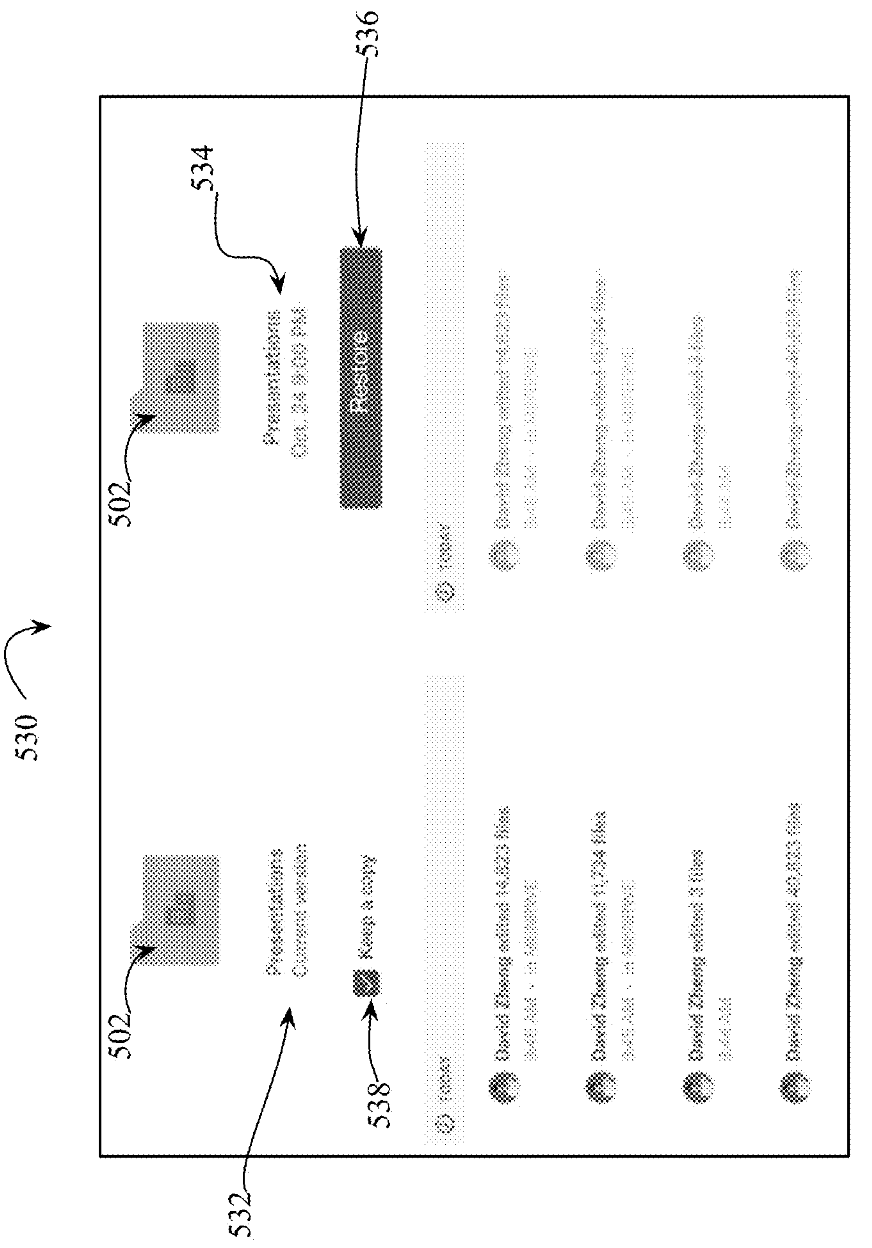

In some embodiments, roll back service 136 can provide a user interface 530 as shown in FIG. 7B that shows a comparison of the current version 532 of directory 502 next to a target version 534 of restored directory 532 after the roll back operation. User interface 530 can also provide a selectable option 538 to keep a copy of the current state of directory 502 after directory 502 has been restored to its earlier state. User interface 530 also presents a selectable option 536 to continue forward to restore directory 502 to its earlier state.

Figure 8:
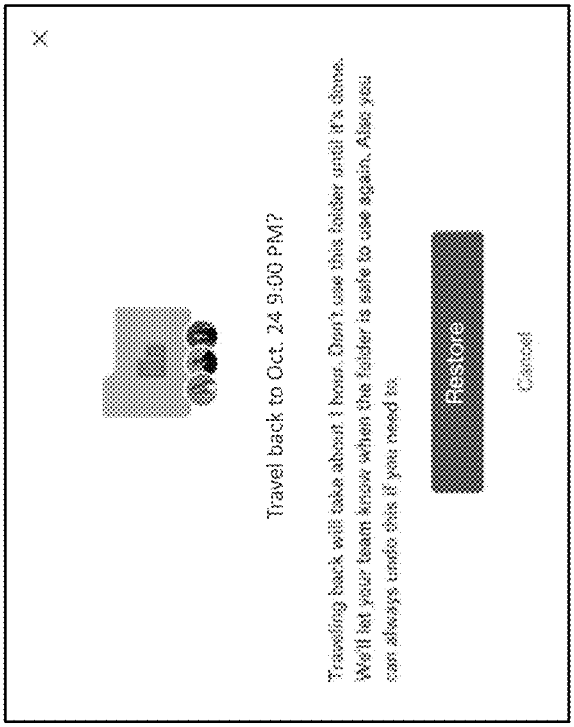
FIG. 8 shows an example user interface in accordance with some aspects of the present technology.

FIG. 8 illustrates an example confirmation interface 540, which prompts the user to confirm that they wish to restore the directory to a state prior to the selected synchronization event 512. In some embodiments confirmation interface 540 can also provide an estimated amount of time to restore the directory. For example as shown in FIG. 8, confirmation interface 540 displays a notification that the rollback operation is expected to take about one hour.

Confirmation interface 540 can also remind the user that a rollback operation can be undone. The operations required to restore the directory to its state prior to the selected synchronization event 512 are all recorded in server file journal 148 just as any other synchronization operation. This means that after the rollback of the directory is completed, the operations required to restore the directory will be presented in folder history panel 504 and the directory can be restored to a time prior to the rollback by using the presently described technology.

Figure 9:
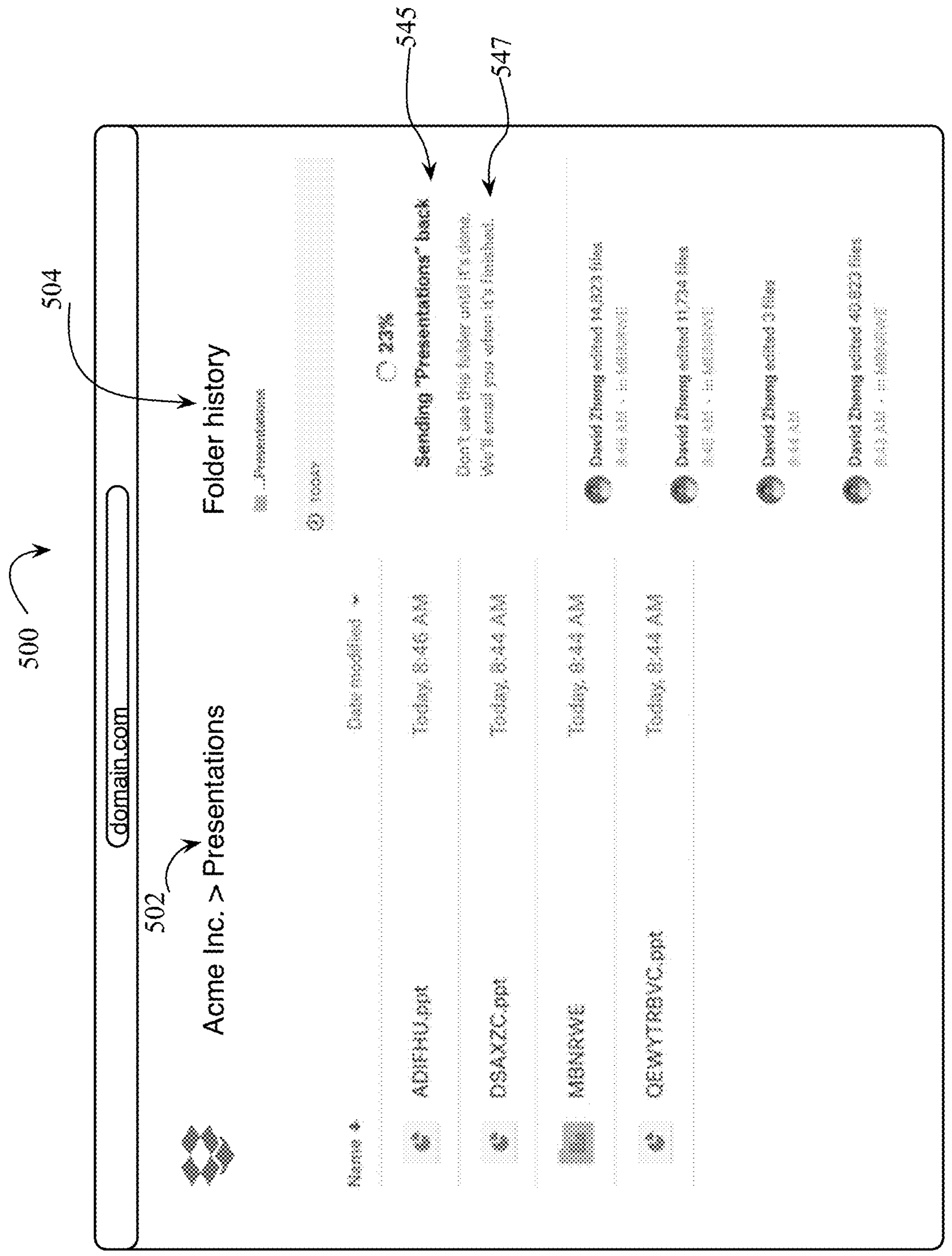
FIG. 9 shows an example user interface in accordance with some aspects of the present technology.

FIG. 9 illustrates user interface 500 after the rollback operation has been initiated. FIG. 9 once again illustrates the contents of directory 502, and shows a progress indicator 545 showing the progress that rollback service 136 has made in restoring the directory to its state prior to the selected synchronization event 512.

As illustrated in FIG. 9, notification 547 warns the user to avoid using directory 502 until the rollback operation has been completed. This notification is provided since any additional operations performed in folder 502 might result in unexpected outcomes for the user. However, owing to the incremental synchronization operations addressed above, additional operations can be performed, but again they may result in unexpected outcomes. For example, if a first user of shared directory 502 initiated a rollback operation, and thereafter a second user added a new content item to shared directory 502, the first user will be surprised to find the added content item in shared directory 502 after the rollback operation has been completed. In another example, if the second user were to edit a content item that is scheduled to be restored to its earlier state, the second user might be surprised to find their edits in a new version of the content item whereby rollback service 136 restored the content item to its earlier state and created a second copy labeled a conflicted copy in order to preserve both versions of the content item. Therefore, it is best if users having access to the directory do not work within the directory during the rollback operation.

After restoring the directory to its state prior to the past synchronization event, web interface service 124 can present a confirmation option requesting the user of the user account to confirm the result of the rollback operation.

Figure 10:
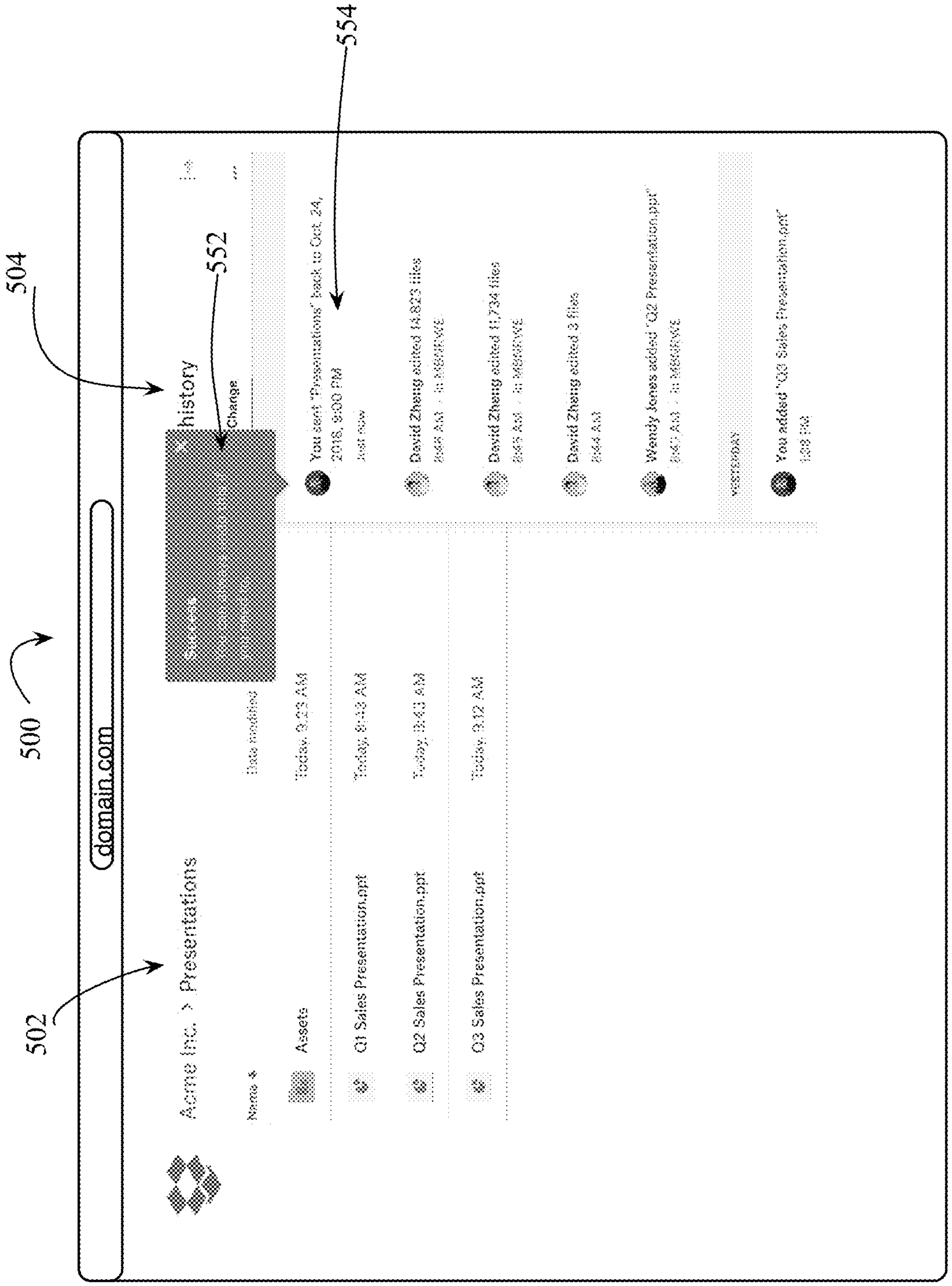
FIG. 10 shows an example user interface in accordance with some aspects of the present technology.

FIG. 10 illustrates user interface 500 showing folder history panel 504 after the roll back operation is complete and directory 502 has been restored to its earlier state. As shown in FIG. 10 user interface 500 can present a notification 552 informing the user that the roll back operation was successful and reminding the user that they can undo the roll back if desired. Meanwhile, folder history panel 504 reflects the roll back as a synchronization event 554 in folder history panel 504. Just like any other synchronization event, folder history panel 504 can be used to restore directory 502 a state prior to the event.

Figure 11:
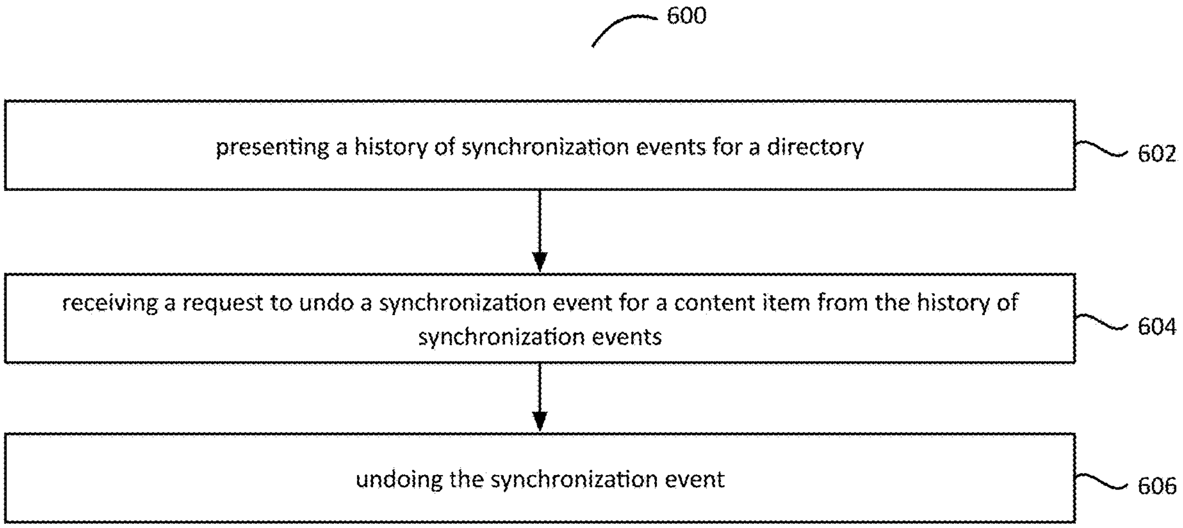
FIG. 11 shows an example method embodiment for undoing a synchronization event(s) in accordance with some aspects of the present technology.

In some embodiments, a user might not wish to restore a directory to a state prior to a past synchronization event, which undoes all changes since that synchronization event took place. Rather, a user might desire to undo a specific synchronization action. FIG. 11 illustrates an example method 600 for undoing a specific synchronization action.

Web interface service 124 can present (602) a history of synchronization events for a directory associated with a user account of the content management system. The user can browse the presented history of synchronization events using client device 150 and can select a synchronization event from the history of synchronization events to undo. The selected synchronization event can be any synchronization event in the history of synchronization events—even an event where many synchronization events may have happened to the same content item subsequent to the selected synchronization event.

In coordination with web interface service 124, rollback service 136 can receive a request to undo the synchronization event selected by the user, and rollback service 136 can undo the selected event only, and leave any subsequent synchronization events unmodified.

Figure 12A:
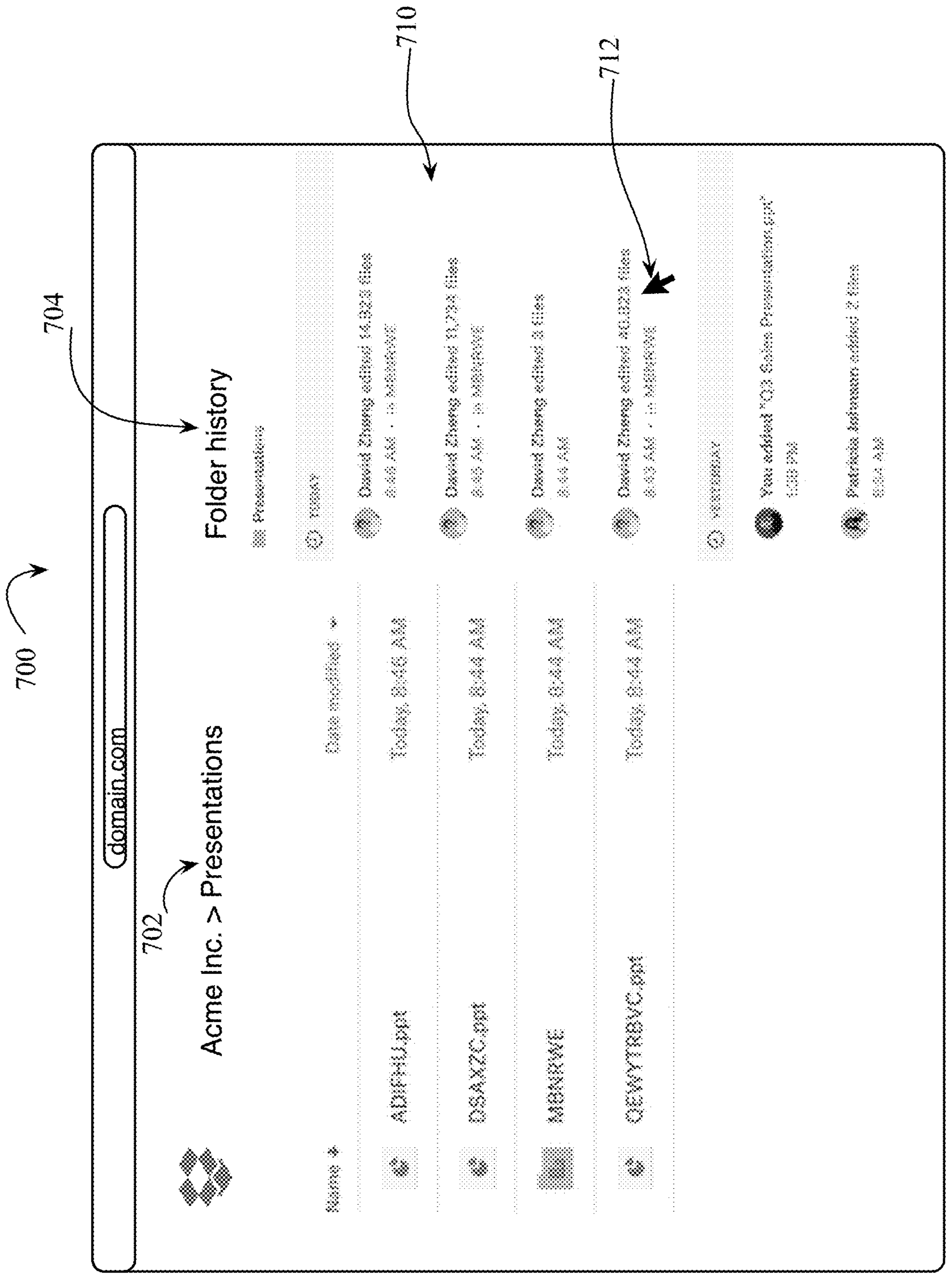
FIG. 12A and FIG. 12B show an example user interfaces in accordance with some aspects of the present technology.

FIG. 12A illustrates example user interface 700 showing directory 702 and folder history panel 704 showing an another embodiment for reversing a past synchronization event. Folder history panel 704 shows synchronization events 710. In some embodiments, synchronization events 710 in folder history panel 704 can be aggregations of synchronization events. The aggregation can be based upon at least one criterion. In some embodiments, the criterion can be that all the synchronization events are received at the same time. In some embodiments the criterion can be that all the synchronization events are the result of the same user action. For example if a user adds a new subdirectory that includes one hundred content items, the user perceives that they have added the new subdirectory while server synchronization service 112 detects that one hundred content items were added and a new subdirectory was created. Accordingly, those events detected by server synchronization service 112 and recorded in server file journal 148 can be aggregated into a single listing in user interface 700.

In some embodiments, a user can operate client device 150 to select an aggregated synchronization event to see all of the underlying actions making up the aggregated synchronization event. In some embodiments, selecting an aggregated synchronization event can also include an indication of information about the user perceivable event (e.g., a move of a folder rather than an add of one hundred separate content items).

FIG. 12A also shows selection 712 of a particular aggregated synchronization event which is an aggregation of 40,823 files that have been edited.

Figure 12B:
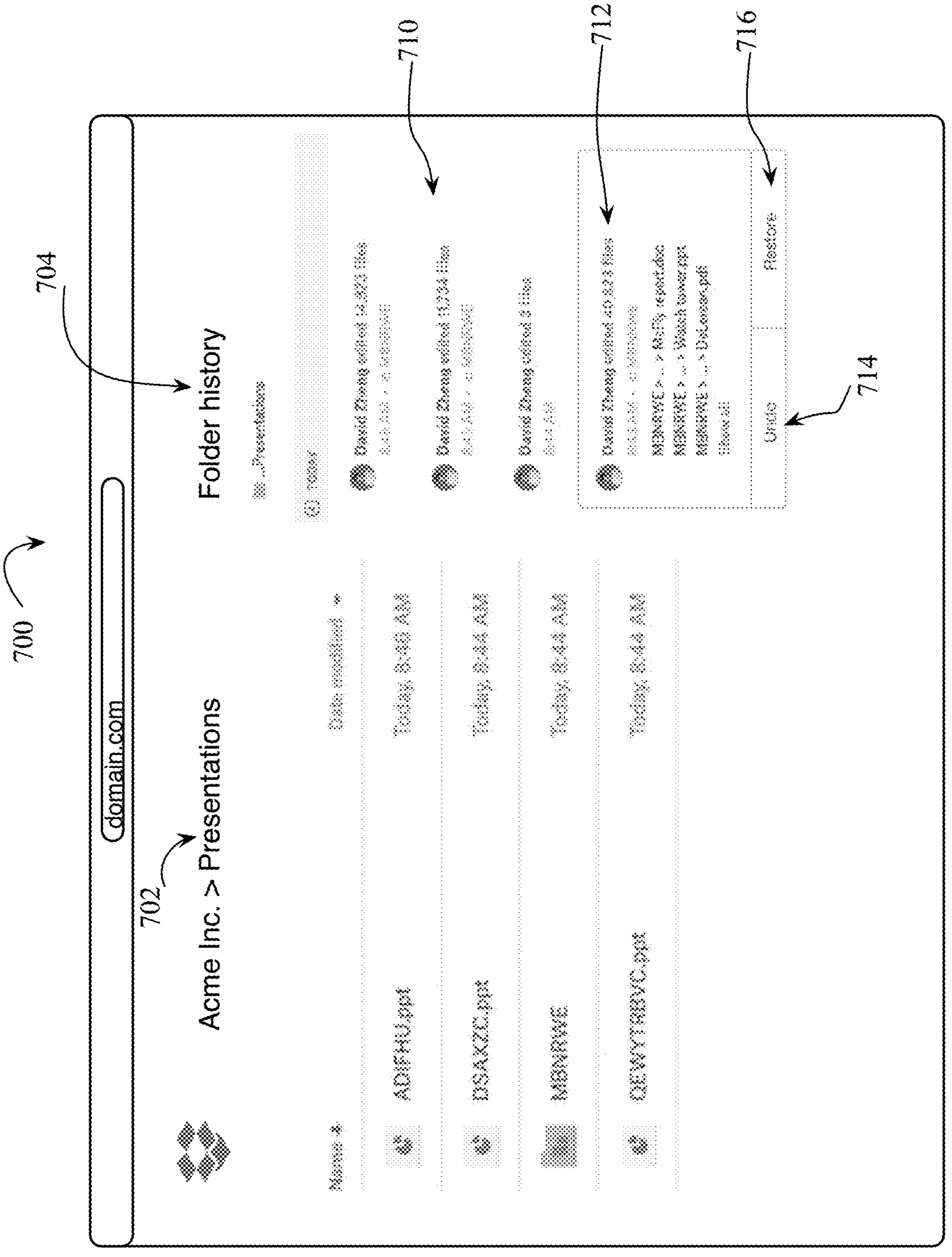

FIG. 12B shows undo option 714 and option restore option 716 resulting from selection 712. If the user were to select the undo option 704, then only synchronization event 712 would become undone and the other synchronization events in the history of synchronization events 710 would remain as addressed with respect to FIG. 11.

As discussed above with respect to the restore operation, the undo operation would be recorded in server file journal 148 and is an event that could be undone later.

When the user wishes to restore the directory to a state prior to selected synchronization events 712, user can operate client device 150 to select restore option 716 to initiate a roll back operation as described above.

Rolling back a directory to an earlier state or undoing a specific synchronization event can lead to several complications depending on the activity in the directory while performing these actions, or depending on the timing of when the directory or subdirectory might have been shared with other users, or depending on the access rights to subdirectories, etc.

One such scenario can occur with a shared directory or content item wherein one user wishes to perform a rollback operation or an undo operation, while another user would prefer to not perform such an operation. In some embodiments, as long as a user is allowed to edit the directory or content item, the operation can be performed. In some embodiments, rollback service 136 can ask users having edit access to the directory or content item to vote. In some embodiments, a user can configure their user account to make a copy of any directory or content item in its present state prior to any other user performing a rollback or undo operation on the content item.

Another scenario can occur when a first user account has access to a directory. At some later time, the directory is shared with another user account. Then, the first user rolls back the directory to a state prior to when the directory was shared with the another user account. In such embodiments, the present technology can rollback the directory to its earlier state, but the permissions to the directory will not be changed. The result will be that the another user account will still have access and will still have the directory mounted in their account—only the contents of the directory will have changed. In some embodiments, the same scenario can be handled by rolling back the directory and unmounting the directory from the another user account. The another user account can have access rights, but they will need to remount the folder to see it. In some embodiments, it is at least technically possible to undo the changes to the access control list, but this is not contemplated as a preferred user experience.

Another scenario can occur when a user account has edit access to a directory, but only read access to a subdirectory. In such a scenario, the user account might initiate a rollback operation on the directory. Rollback service 136 will rollback the directory and any subdirectory to which the user account has edit access, but will not rollback any subdirectory to which the user account does not have adequate permissions.

Content item and folder moves also give rise to complications during rollback operations. In one scenario, a content item or folder has been moved into a directory to be restored to a state prior to when the content item or folder has been moved into the directory. In such a scenario, at the time the content item or folder has been moved into the directory it no longer exists in its previous location. If a rollback operation to a time prior to when the content item or folder was moved is performed on the directory, the directory will be restored to a state that does not include the content item or folder. However, if the previous location of the folder was not also rolled back, the content item or folder would disappear, which is not desirable. In some embodiments, this scenario can be handled by, after the rollback operation has completed, rollback service 136 can restore the content item or folder back into the directory that was restored to an earlier state. In this case the directory would be in its earlier state except it would also include any content items that were moved into the folder subsequent to the earlier state. In some embodiments, this scenario can be handled by moving the content item or folder that has no logical place into a conflicts folder to preserve the content item. In some embodiments, rollback service 136 can prompt the user to make a decision. In some embodiments, the content item or folder can be restored to its previous location provided that the user account has appropriate rights to perform this operation. In some embodiments, this scenario can be handled by making multiple copies of the content item or folder that does not have any other place it clearly belongs and locate the copies in several possible locations.

In some embodiments, a directory might include other top-level directories mounted within. For example, a directory might include a top-level directory for a user's personal account with the content management system, and can include a top-level directory for a user's work account with the content management system. Or, within a user's work account, the user can belong to multiple team directories are special directories that have some additional features attached to them. In such scenarios, any rollback operation occurring on a folder including a top-level directory, or special directory such as a team folder, will not rollback these other directories even if the user account has sufficient access rights to perform a rollback operation on them. Instead, rollback service 136 will require a user to separately select any top-level directory or special directory to be individually selected for a rollback.

As described herein, the folder history panel can be a useful feature to investigate events that occurred within a directory, and to investigate potential unexpected or undesired states of the directory. As the history of synchronization events 510 can be lengthy, rollback service 136 can also provide filters to sort or filter the history of synchronization events 510 to help navigate to the events in the history of synchronization events 510. Some filters or sorting options include time ranges, number of changes in an event, types of synchronization events, user account causing the event, etc.

Once an event that looks problematic has been identified, rollback service 136 can also provide functionality to share a view of an event with a team member or administrator or customer support for further investigation or discussion.

Figure 13:
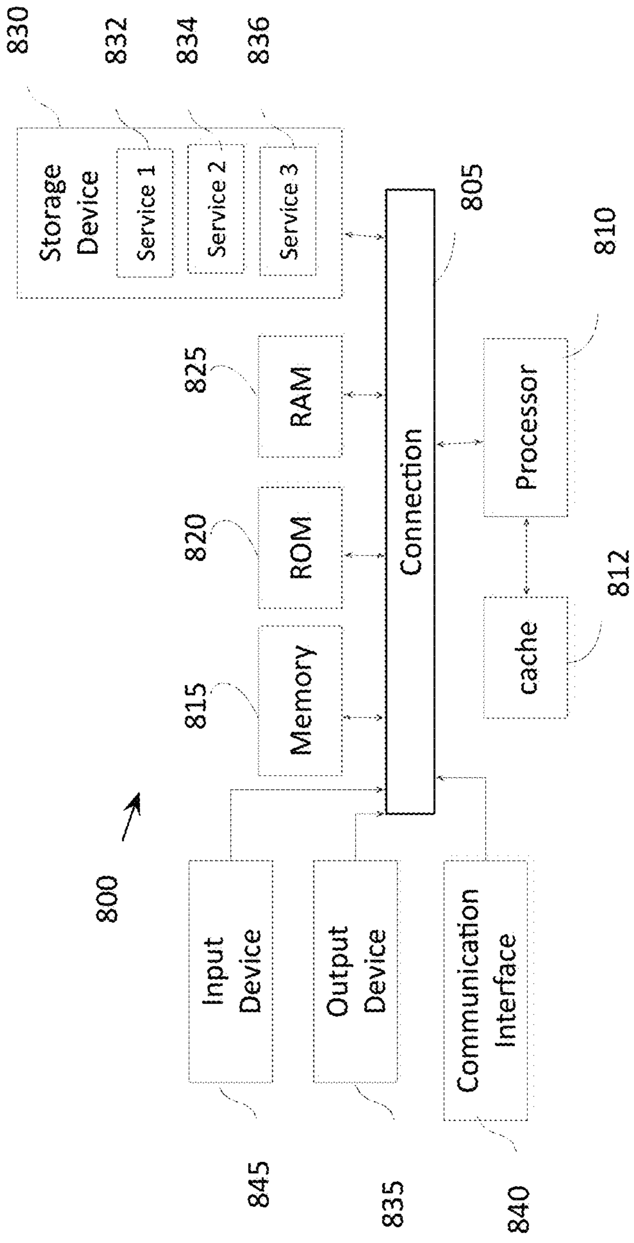
FIG. 13 shows an example of a system for implementing certain aspects of the present technology.

FIG. 13 shows an example of computing system 800, which can be for example any computing device making up client device 150, content management system 110 or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

The operations of methods described herein are intended to be illustrative. In some implementations, the methods may be accomplished with one or more additional operations not described, and/or without one or more of the operations discussed. Additionally, the order in which the operations in methods disclosed herein are not intended to be limiting. While methods disclosed herein may be addressed with respect to one or more components of system embodiments, the methods should not be considered limited to performance by such components or architectures of the system embodiments.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:

causing, by a content management system, a client device associated with a first user account to present a content item directory displaying a first set of content items in a shared directory and a history panel displaying a history of synchronization events for the shared directory in a user interface, wherein the synchronization events represent events in which the shared directory is synchronized between the content management system and one or more client devices including the client device;

receiving, from the client device via the user interface, a request to return a subdirectory of the shared directory to a target state prior to a past synchronization event of the history of synchronization events of the subdirectory, wherein determining the target state comprises reading from the history of synchronization events, the history of synchronization events including locations of data making up content items at the target state and paths of the content items;

restoring a directory structure of the subdirectory by performing reverse synchronization actions that reconstructs the directory structure to the target state prior to the past synchronization event based on the history of synchronization events;

after the restoring the directory structure, restoring each content item to one or more blocks of each content item, wherein during the restoration of the directory structure, the content management system receives additional synchronization events for synchronizing the shared directory and the content management system; and in response to a request to view the subdirectory of the shared directory, causing, by the content management system, to present, in the user interface of the client device, a current state of the subdirectory and at least a subset of the history of synchronization events for the subdirectory of the shared directory of the content management system.

2. The method of claim 1 wherein:

the history of synchronization events for the shared directory includes an aggregated synchronization event that is a grouping of synchronization events, and the method further comprises:

receiving, by the content management system, a selection of the aggregated synchronization event; and presenting, by the content management system, details that pertain to the aggregated synchronization event, wherein the details include a criterion upon which the grouping of synchronization events was aggregated or the details include a listing of the synchronization events in the grouping of synchronization events.

3. The method of claim 1, comprising:

treating the additional synchronization events as synchronization events occurring after the restoring the directory structure;

checking for reverse synchronization actions that become unnecessary due to the additional synchronization events; and omitting from the restoring the directory structure the reverse synchronization actions that become unnecessary due to the additional synchronization events.

4. The method of claim 1 further comprising:

prior to returning the shared directory to the past synchronization event, elevating access privileges for a user account having multiple privilege levels to a higher privileged level.

5. The method of claim 1 further comprising:

prior to returning the shared directory to the past synchronization event, presenting a preview of the shared directory reflecting a state the shared directory will be in after returning the shared directory to the past synchronization event.

6. The method of claim 1, further comprising:

after returning the shared directory to the past synchronization event, presenting a confirmation option requesting the first user account to confirm a result of the returning the shared directory to the past synchronization event.

7. The method of claim 1, wherein the returning the shared directory to the past synchronization event comprises:

reading a list of synchronization events from a server file journal that have occurred in the shared directory subsequent to the past synchronization event;

determining an end state of directory after it has been returned to the past synchronization event;

planning synchronization actions necessary to return the shared directory to the past synchronization event;

executing the synchronization actions necessary to return the shared directory to the past synchronization event; and recording the executed synchronization actions in the server file journal.

8. The method of claim 7, further comprising:

after executing the synchronization actions necessary to return the shared directory to the past synchronization event at the content management system, synchronizing the shared directory on the content management system with the client device.

9. The method of claim 1, further comprising:

receiving commands effective to navigate the first user account to the shared directory within a first user account directory prior to the presenting the history of synchronization events for the shared directory.

10. A non-transitory computer-readable medium including instructions stored thereon, the instructions, when executed by a computing system being effective to cause the computing system to:

cause a client device associated with a first user account to present a content item directory displaying a first set of content items in a shared directory and a history panel displaying a history of synchronization events for the shared directory in a user interface, wherein the synchronization events represent events in which the shared directory is synchronized between a content management system and one or more client devices including the client device;

receiving, via the user interface, a request to return a subdirectory of the shared directory to a target state prior to a past synchronization event of the history of synchronization events of the subdirectory, wherein determining the target state comprises reading from the history of synchronization events, the history of synchronization events including locations of data making up content items at the target state and paths of the content items;

restoring a directory structure of the subdirectory by performing reverse synchronization actions that reconstruct the directory structure to the target state prior to the past synchronization event based on the history of synchronization events;

after the restoring the directory structure, restoring each content item to one or more blocks of each content item, wherein during the restoration of the directory structure, the content management system receives additional synchronization events for synchronizing the shared directory and the content management system; and in response to a request to view the subdirectory of the shared directory, causing, by the content management system, to present, in the user interface of the client device, a current state of the subdirectory and at least a subset of the history of synchronization events for the subdirectory of the shared directory of the content management system.

11. The non-transitory computer-readable medium of claim 10, wherein the history of synchronization events for the shared directory includes an aggregated synchronization event that is a grouping of synchronization events.

12. The non-transitory computer-readable medium of claim 11, wherein the instructions cause the computing system to:

receive a selection of the aggregated synchronization event; and present details that pertain to the aggregated synchronization event, wherein the details include a criterion upon which the grouping of synchronization events was aggregated or the details include a listing of the synchronization events in the grouping of synchronization events.

13. The non-transitory computer-readable medium of claim 10, wherein the instructions cause the computing system to:

prior to the return of the shared directory to the past synchronization event, elevate access privileges for a user account having multiple privilege levels to a higher privileged level.

14. The non-transitory computer-readable medium of claim 10, wherein the instructions cause the computing system to:

after executing the reverse synchronization actions necessary to return the shared directory to the past synchronization event at the content management system, synchronizing the shared directory on the content management system with the client device.

15. The non-transitory computer-readable medium of claim 10, wherein the instructions cause the computing system to:

receive commands effective to navigate the first user account to the shared directory within a first user account directory prior to the presenting the history of synchronization events for the shared directory.

16. A system comprising:

one or more processors; and memory having instructions stored thereon, that when executed the instructions are effective to cause the one or more processors to:

cause a client device associated with a first user account to present a content item directory displaying a first set of content items in a shared directory and a history panel displaying a history of synchronization events for the shared directory in a user interface, wherein the synchronization events represent events in which the shared directory is synchronized between a content management system and one or more client devices including the client device;

receive, from the client device via the user interface, a request to return a subdirectory of the shared directory to a target state prior to a past synchronization event of the history of synchronization events of the subdirectory, wherein determining the target state comprises reading from the history of synchronization events, the history of synchronization events including locations of data making up content items at the target state and paths of the content items;

restore a directory structure of the subdirectory by performing reverse synchronization actions that reconstruct the directory structure to the target state prior to the past synchronization event based on the history of synchronization events;

after the restoring the directory structure, restore each content item to one or more blocks of each content item, wherein during the restoration of the directory structure, the content management system receives additional synchronization events for synchronizing the shared directory and the content management system; and in response to a request to view the subdirectory of the shared directory, causing, by the content management system, to present, in the user interface of the client device, a current state of the subdirectory and at least a subset of the history of synchronization events for the subdirectory of the shared directory of the content management system.

* * * * *